United States Patent [19]
Herbst et al.

[11] Patent Number: 5,663,563
[45] Date of Patent: Sep. 2, 1997

[54] ELECTRONIC EFFECTIVE FOCAL LENGTH COMPENSATOR

[75] Inventors: Stephen J. Herbst, Redondo Beach; Weston Furukawa, Los Angeles, both of Calif.

[73] Assignee: Hughes Electronics, Los Angeles, Calif.

[21] Appl. No.: 603,663

[22] Filed: Feb. 20, 1996

[51] Int. Cl.$^6$ .................. G01J 5/00; H04N 5/33
[52] U.S. Cl. .................. 250/332; 250/334; 348/295
[58] Field of Search .................. 348/295, 297; 250/334, 332

[56] References Cited

U.S. PATENT DOCUMENTS

| | | | |
|---|---|---|---|
| 4,466,748 | 8/1984 | Needham | 374/129 |
| 4,728,804 | 3/1988 | Norsworthy | 250/578 |
| 5,453,781 | 9/1995 | Stein | 348/169 |
| 5,510,618 | 4/1996 | Blecha et al. | 250/332 |

FOREIGN PATENT DOCUMENTS

| 1-124728 | 5/1980 | Japan | 250/332 |
|---|---|---|---|

*Primary Examiner*—Constantine Hannaher
*Attorney, Agent, or Firm*—Gordon R. Lindeen III; Michael W. Sales; Wanda K. Denson-Low

[57] ABSTRACT

A system for producing a high quality scene image in a thermal imaging system by electronically compensating for variations in the imaging system imager focal length. The system includes optics (16, 18) for detecting a scene (14), a detector assembly (27) being responsive to energy from the detected scene; and an imager (25) for imaging the energy from the detected scene onto the detector assembly (27). The imager (25) includes a temperature sensor (25b) for sensing imager lens temperature. The detector assembly (27) outputs electric signals in response to the energy from the detected scene at a first clock sample rate. The system further includes a processor (84) for controlling the first clock sample rate of the detector assembly to maximize detected scene image quality through variation of the first clock sample rate to automatically compensate for imager lens focal length variation due to ambient temperature changes in the imager lens (25a) and due to inherent manufacturing tolerances.

18 Claims, 6 Drawing Sheets

ELECTRONIC EFFECTIVE FOCAL LENGTH COMPENSATOR

BACKGROUND OF THE INVENTION

1. Technical Field

The present invention relates generally to thermal imaging systems, and in particular to a system for electronically compensating for changes in system imager lens focal length.

2. Discussion

Scanning thermal imaging systems are used in a variety of applications, including surveillance systems and target detection/recognition systems. Such systems typically incorporate a telescopic lens assembly coupled to a scanner. The scanner scans energy from a scene through an imager lens assembly onto a detector array having a plurality of photoelectrically responsive detector elements perpendicular to the scan direction. Each of these detector elements provides an electric signal proportional to the flux of infrared light on the particular detector element. Electric signals generated from the detector elements are subsequently processed by system sensor electronics to create an image that is displayed on a system output device. To improve sensitivity, some of these systems incorporate detectors parallel to the scan direction. The output of these detectors are delayed in time from each other such that, ideally, the scanned image is output simultaneously on all of the parallel detectors. The delayed outputs are then summed (integrated). This process is referred to as time delay and integrate (TDI).

In the above-mentioned thermal imaging systems with TDI, the correct amount of time delay is crucial to a high resolution video signal output. If the delay is not correct, the instantaneous summed output will consist of information from different parts of the scene thereby blurring the information. Moreover, many of the detectors with TDI incorporate multiple subarrays of detector elements. The signal processing electronics must remove the time separation of the images caused by the spatial separation of the subarrays by delaying the output of one or more of the subarrays. The proper delay is related to the spacing between the parallel detectors and subarrays, the scan velocity, and the imager effective focal length. This relationship must be held constant for optimum performance. Unfortunately, there can be variations in both the imager effective focal length and scan velocity due to manufacturing tolerances and/or environmental effects (e.g. temperature) that, unless compensated for, will degrade performance.

In traditional thermal imaging systems with TDI, various methods have been used to ensure the correct amount of time delay. To ensure the correct imager effective focal length, mechanical devices have been implemented in the system to move imager components to compensate for imager lens property fluctuations with temperature. These devices can be either active, such as a motor, or passive, such as a material that has specific thermal expansion properties that compensate for the thermal properties of the imager lenses. However, such traditional thermal imager lens compensating devices tend to increase system complexity, and thus cost, due to the additional associated components and engineering design involved in implementing these devices. Reflective optical elements also have been used to prevent changes in the imager effective focal length over temperature since this type of optics has little temperature sensitivity; however, reflective optics are often difficult to package in the tight volume available for many of these thermal imaging systems.

What is needed then is an electronically implemented focal length compensator that compensates for both changes in temperature and manufacturing tolerances, thereby eliminating the need for the aforementioned conventional mechanically-implemented focal length compensators or reflective optics and thereby minimizing system cost, complexity and system volume requirements.

SUMMARY OF THE INVENTION

In accordance with the teachings of the present invention, an electronic focal length compensator is provided for use in thermal imaging applications to compensate for imager focal length variations caused by temperature and to compensate for inherent manufacturing tolerances. This method may also be used to compensate for scanner velocity variations. The present invention provides an electronically implemented focal length compensator that eliminates the need for implementation of additional system parts, thereby minimizing the complexity of the imager lens assembly.

In particular, a thermal imaging system is provided that includes optics for detecting a scene. The system includes a detector assembly being electrically responsive to energy from the detected scene and outputting signals corresponding thereto. An imager is provided that includes at least one imager lens for imaging the energy from the detected scene onto the detector assembly to form a scene image. The imager includes a temperature sensor for monitoring imager temperature and an imager lens. First clock means samples detector assembly output signals at a first clock sampling rate and induces a time delay to the signals. A processor is also provided for controlling the first clock sampling rate to ensure correct time delay, with the processor varying the sampling rate to compensate for variances in imager lens focal length, and if required, scanner velocity.

BRIEF DESCRIPTION OF THE DRAWINGS

Other objects and advantages of the invention will become apparent upon reading the following detailed description and upon reference to the drawings, in which.

DETAILED DESCRIPTION OF THE PREFERRED EMBODIMENT

The following description of the preferred embodiments is merely exemplary in nature and is in no way intended to limit the invention or its application or uses.

Figure 1:
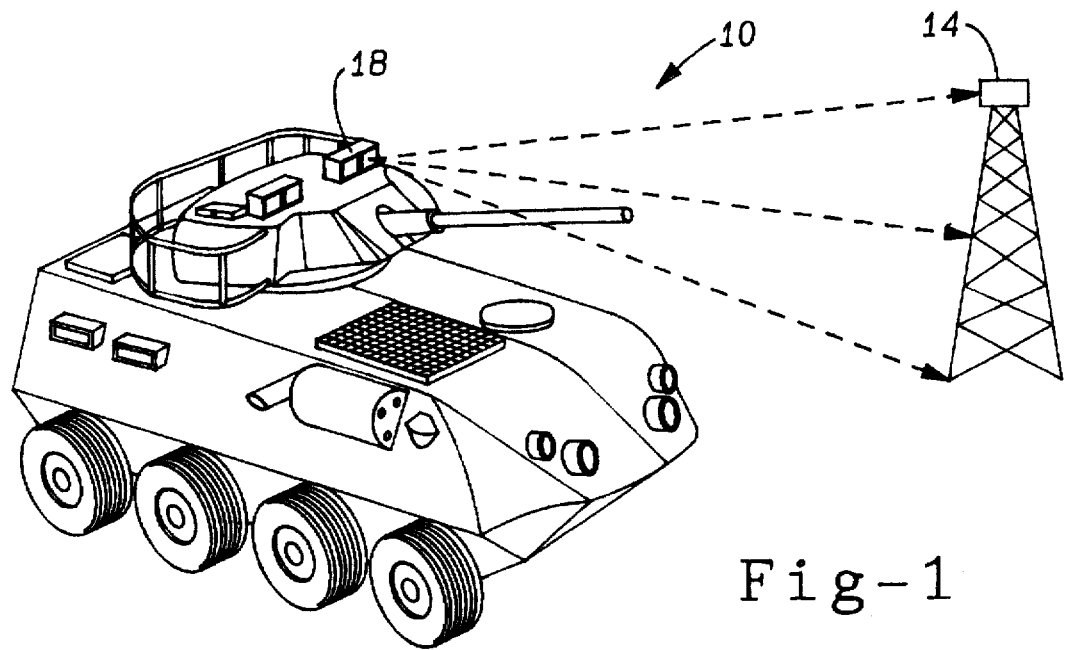
FIG. 1 illustrates an LAV-25 light armored vehicle in which the present invention may be implemented.
Figure 2:
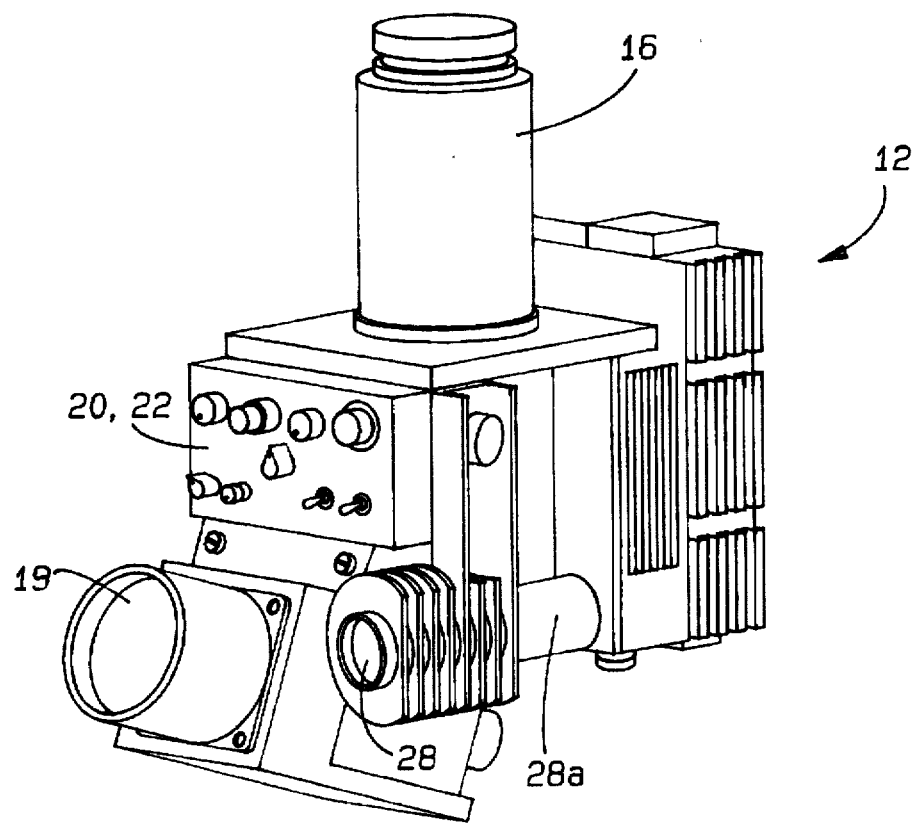
FIG. 2 is a perspective view of a thermal imaging system unit in which the preferred embodiment of the present invention is implemented.

Referring to the drawings, FIG. 1 shows an LAV-25 light armored vehicle 10 in which the preferred embodiment of the present invention is implemented. As shown in FIGS. 1 and 2, the present invention is implemented as part of a thermal imaging unit 12, which processes energy reflected from a detected target scene 14 back through a system telescope assembly 16 coupled to an externally mounted head mirror 18.

Preferably, the thermal imaging unit 12 is a Hughes Infrared Equipment (HIRE) thermal imaging sensor unit. The HIRE unit is a high performance light weight modular fire control sight and thermal imaging system that is capable of providing superior vision capability through total darkness, smoke, dust, and other types of adverse conditions. The HIRE system may be implemented in a wide variety of environments, including in a variety of armored vehicles, such as the LAV-25, Piranha, Desert Warrior, and LAV-105. The thermal imaging unit 10 provides stand alone thermal imaging capability, but can also be configured for use with TOW missile fire control systems. The unit incorporates several commercially available major components, thereby reducing logistics requirements through commonality of such things as repair facilities, support equipment, training programs and spare parts. The EFL compensator of the present invention enables the thermal imaging sensor unit to provide a significant improvement in imaging unit image quality and range performance possible with TDI detectors without the increased cost and complexity of traditional compensators.

It should be appreciated that, although the electronic focal length (EFL) compensator according to the present invention is preferably implemented in a HIRE system, it may also be implemented in any system requiring focal length compensation for changes in a system's effective focal length and/or scanner velocity.

Referring to FIGS. 1–5, the telescope assembly 16, through which target searching and sighting functions are achieved, is implemented in a protected environment within the vehicle 10. The head mirrors 18 are implemented to relay a detected scene to the telescope assembly 16. Subsequent to target scene thermal energy signal being processed by the thermal imaging unit, as will be described below, the scene is viewed through a gunner display 19 operatively coupled to a display control panel 20 and a commander display 21 coupled to a commander display control panel 22.

Figure 3:
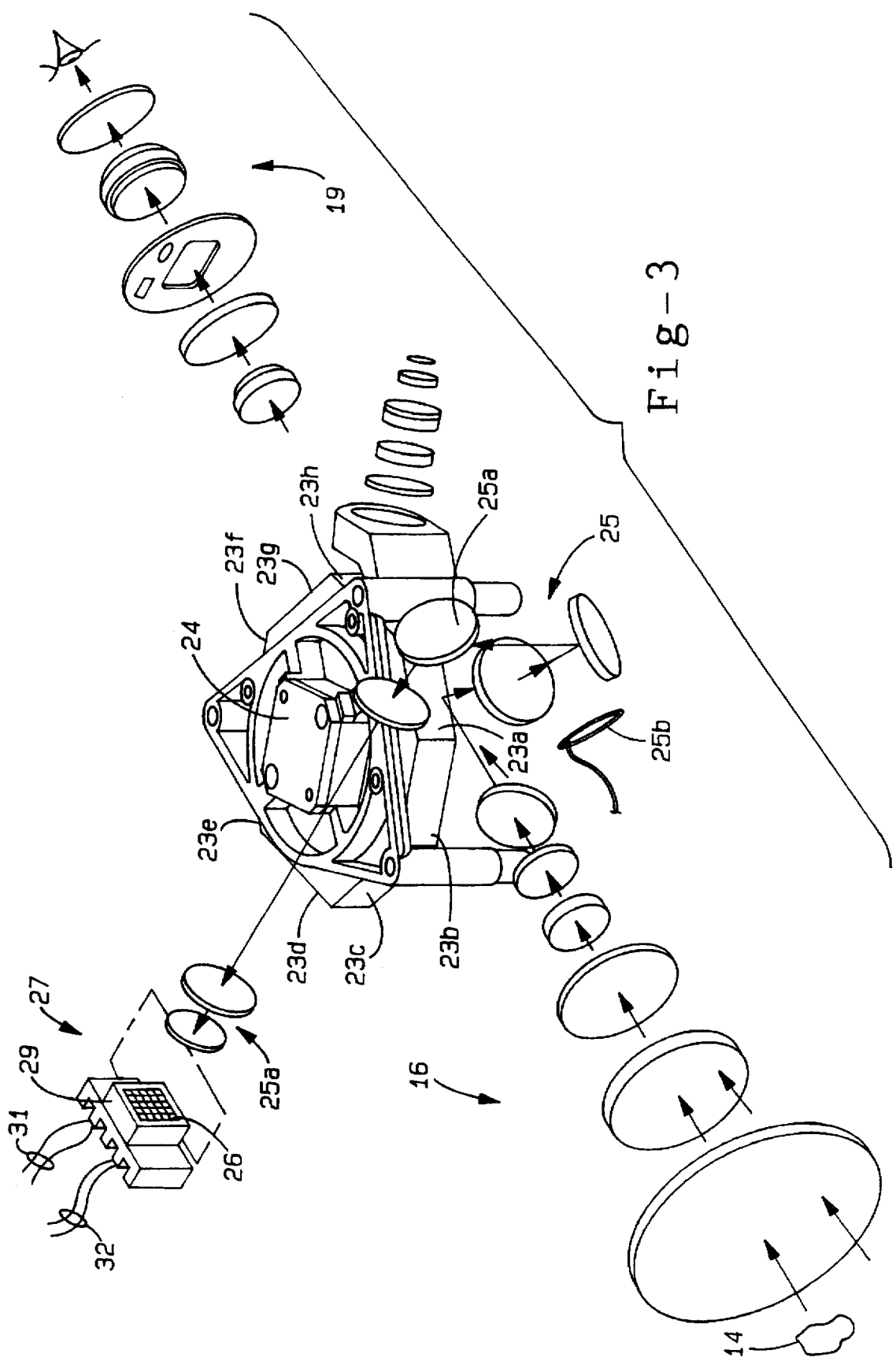
FIG. 3 is a partial exploded view of the thermal imaging system shown in FIG. 2.

As shown in FIG. 3, energy from the detected scene is transmitted through the thermal imaging unit 12 to a polygonal, mirrored scanner 23 rotated by a scanner motor 24. The scanner includes 8 facets 23a–23h, each of which is cut at an angle to effect displacement of the scanned scene energy on the detector array by a discrete amount. The cut and displacement effected by each facet is shown below:

TABLE I

| FACET | CUT | DETECTOR ARRAY ENERGY DISPLACEMENT (IN PIXELS) |
|---|---|---|
| 23a | Normal | 0 |
| 23b | Interlaced | −½ |
| 23c | Up | +1 |
| 23d | Interlaced | −½ |
| 23e | Down | −1 |
| 23f | Interlaced | −½ |
| 23g | Normal | 0 |
| 23h | Interlaced | −½ |

As the scanner rotates, the scanner mirrors reflect the scene energy at successively varying angles through an imager assembly shown generally at 25. The imager assembly includes imager lenses, such as the lens 25a, which image the scene onto a detector array 26 housed within a detector assembly 27. The imager assembly 25 also includes an imager optics temperature sensor 25b for monitoring the temperature of the imager. The detector assembly 27 is housed within a dewar 28 and cooled by a cooler 28a to cryogenic temperatures. A cold shield 29 housed within the dewar 28 limits the thermal energy that can be seen by the detector such that the detector elements only detect scene energy input through the telescope assembly optics and not other peripheral forms of energy input into the system, such as energy from the warm sides of the housing. The cold shield thereby reduces input noise and thereby improves overall system image quality.

Figure 4:
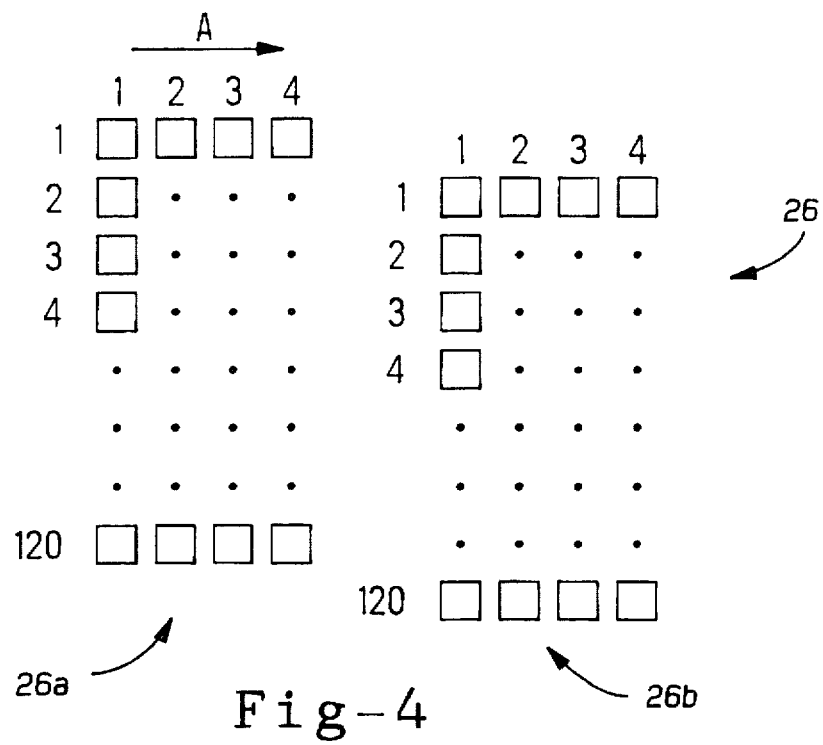
FIG. 4 illustrates the arrangement of the detector assembly elements shown partially in FIG. 3.

As shown partially in FIG. 3 and more fully in FIG. 4, the detector array 26 of the present invention consists of two staggered 120×4 subarrays 26a, 26b of detector elements, with each element being sensitive to light in the infrared spectrum and each having a detector element output. As the scanner scans the image of the scene across the detector in the direction indicated by the arrow A shown in FIG. 4. The output of each detector element is input to a readout integrated circuit (ROIC) 27a (FIG. 5) associated with the detector assembly which samples the output, provides the time delay and integration (TDI) of the four parallel detector elements in each detector element row, and multiplexes the 240 resulting TDI detector channels into 4 video output channels 31, 32, with output channels 31 carrying output signals from the first 120×4 detector subarray 26a, and output channels 32 carrying output signals from the second detector subarray 26b. The ROIC includes a TDI clock 27b that determines when the detector outputs are sampled at the TDI, a multiplexer 27c, and a higher speed detector clock 27d for the ROIC multiplexer, which preferably has a minimum 60:1 sample period.

In the preferred embodiment, the 4 multiplexed output channels of the detective assembly are further multiplexed into one channel by the signal processing electronics at an input high speed clock (HCLK) rate which preferably has a minimum 240:1 sample period and is associated with system electronics described below in reference to FIG. 6. As will be described in detail below, the EFL compensator of the present invention varies the sample rate of the DCLK 27d to control the sample rate of the TDI clock 27b.

Presently implemented detector arrays typically feature 60 to 120 detector elements, with each having an associated output wire. Thus, the detector array of the present invention exhibits higher resolution due to the additional detector elements. Further, the detector array of the present invention utilizes multiplexed detector array output lines, thereby minimizing detector element output wires and thus minimizing area required to implement the array and facilitating ease of assembly and repair.

Figure 5:
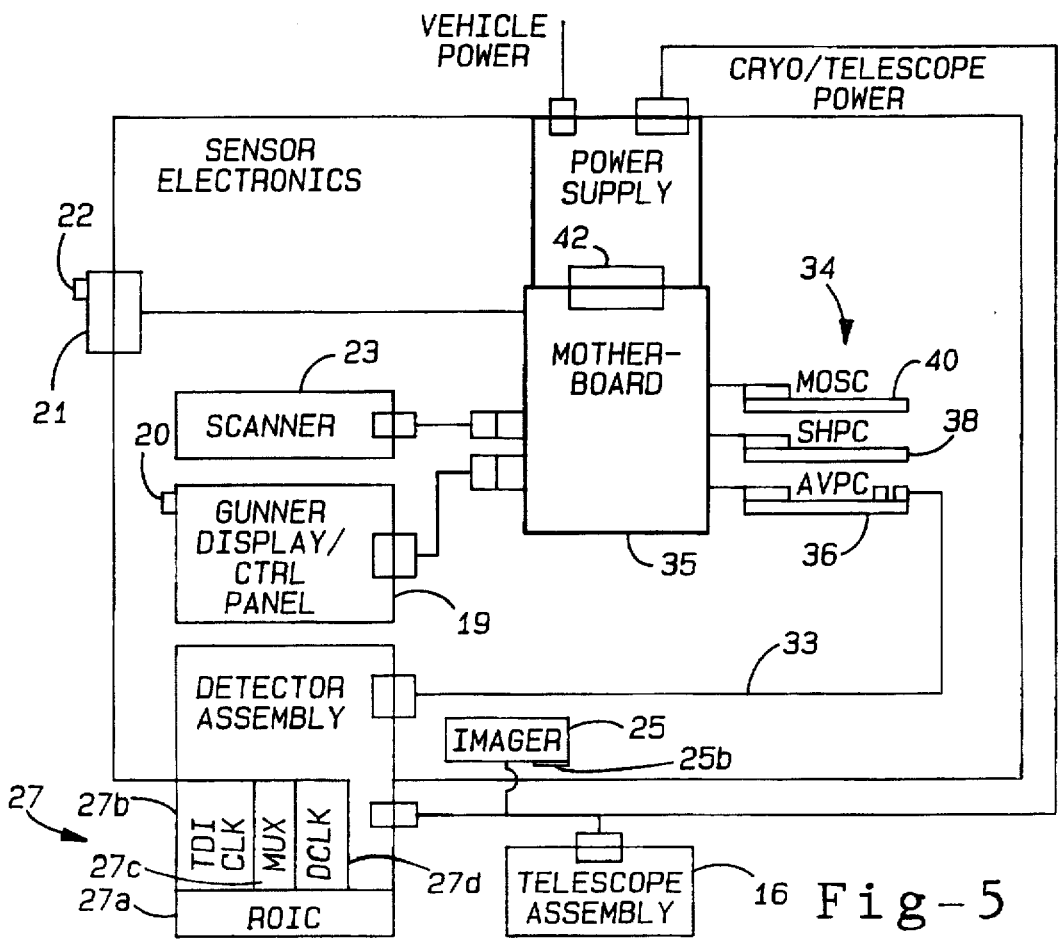
FIG. 5 is a block diagram of the thermal imaging system unit shown in FIG. 2.

Referring now to FIG. 5, operation of the imaging system components is controlled generally by the system electronics 34. The system electronics 34 are implemented on three cards coupled to a system mother board 35. The cards include an analog video processing card (AVPC) 36, a scene based histogram processor card (SHPC) 38 and a memory output symbology card (MOSC) 40. The associated functions of each of these cards will be discussed in greater detail below. Also coupled to the mother board 35 is a power supply card 42 that receives power input from the vehicle in which the system is implemented and outputs power to various system components at voltage levels required by the individual system components.

Figure 6:
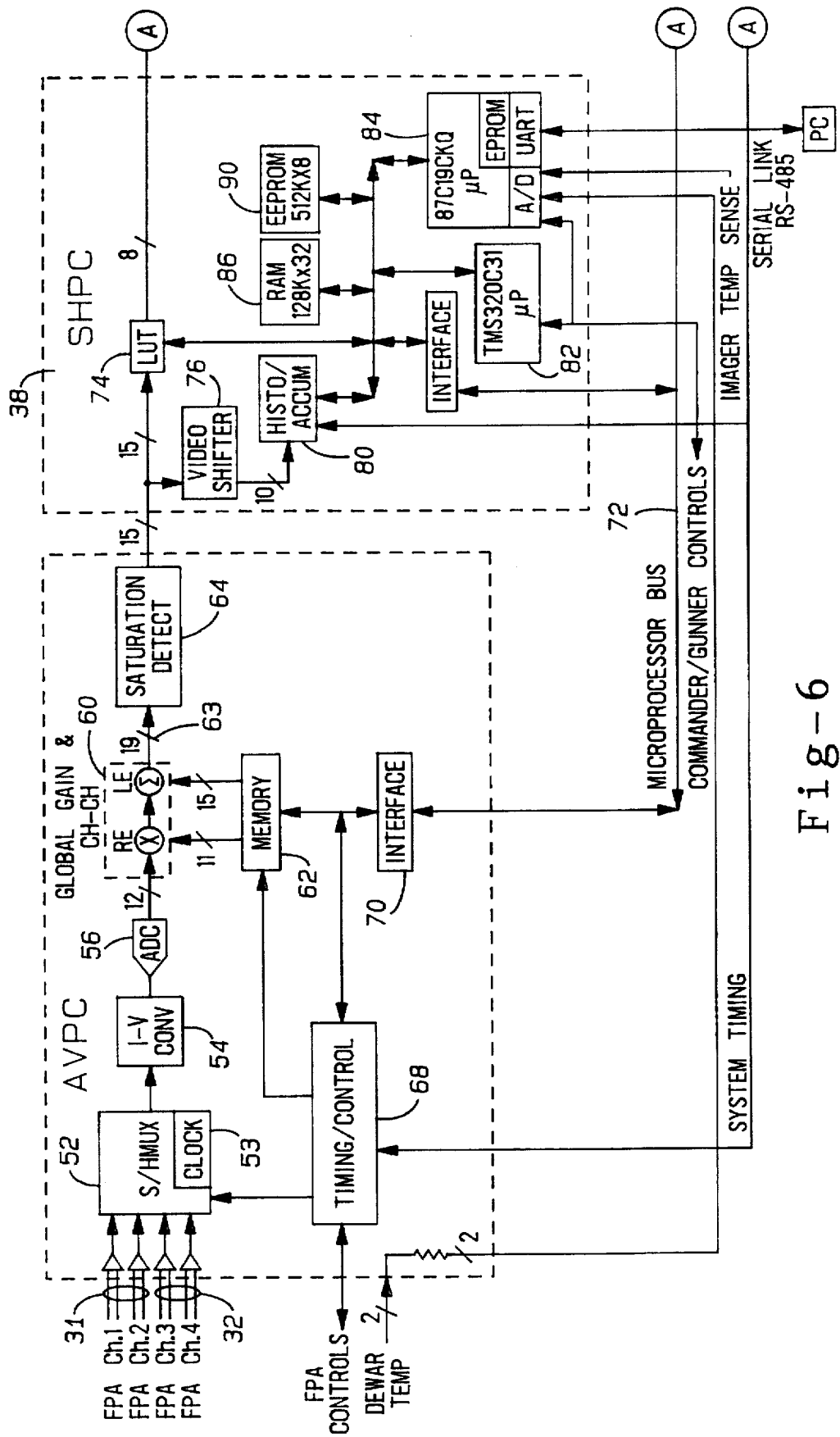
FIGS. 6–6A are block schematic diagrams of system electronics of the thermal imaging system of the present invention.
Figure 6A:
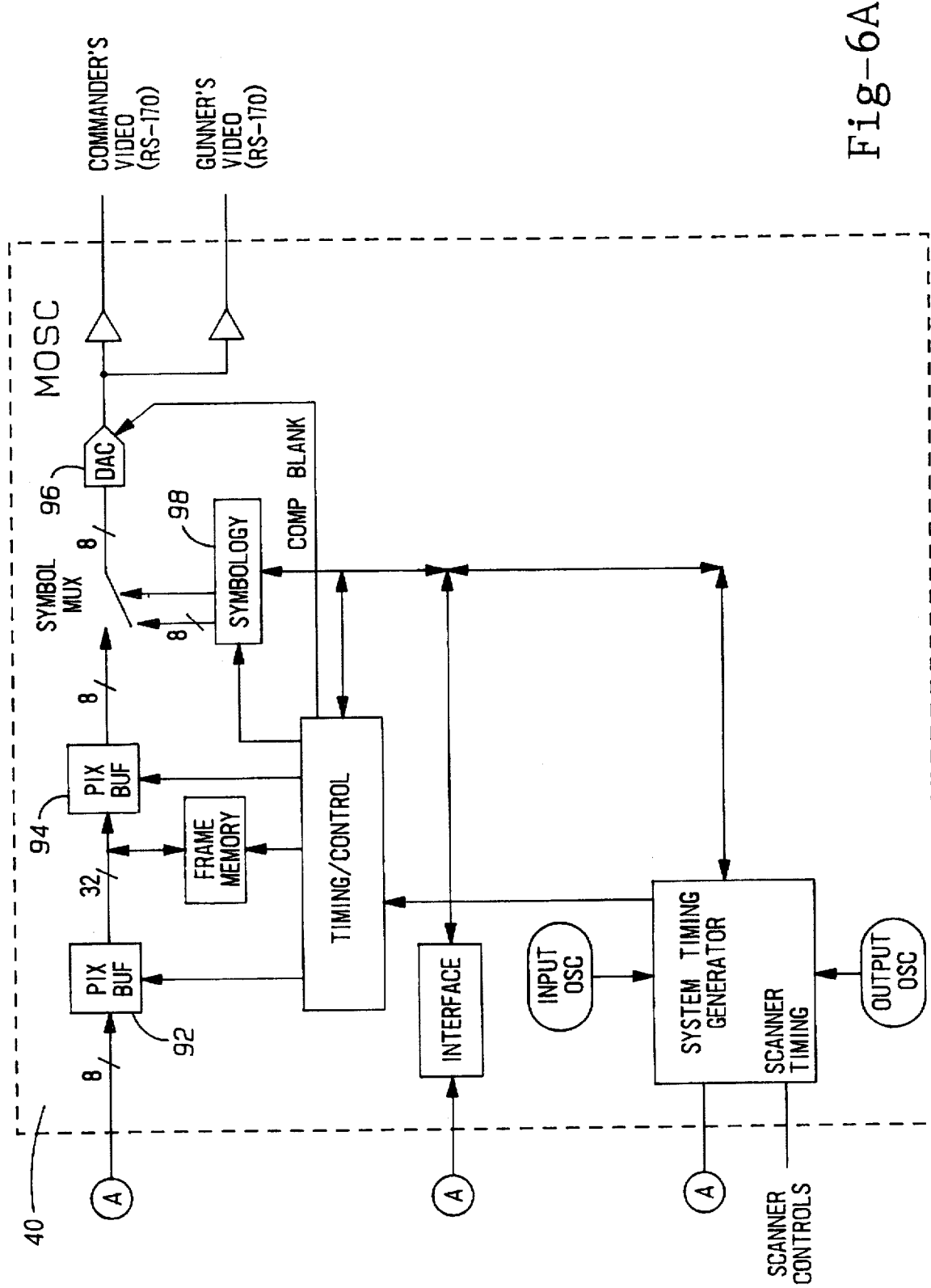

Referring now in detail to FIG. 6, an overall block diagram showing the components implemented on the three cards 36, 38 and 40 shown. Referring first to the AVPC card 36, channel outputs 31, 32 are input into an S/HMUX 52 having an associated high speed system multiplier clock (HCLK) 53. Preferably, all 960 detector elements (240 pixels) are clocked during the clock sample period. The S/HMUX 52 is preferably a HUGHES custom integrated circuit, Part No. 6364060PGA-DEV, designed to sample and further multiplex the multiplexed detector element outputs. These multiplexed signals are sampled at an adjustable sample rate. However, for further signal processing, the signals are converted to voltage signals through I-V converter 54. Once these signals are converted, the signals are digitized by an analog to digital converter 56.

After being converted into digital signals, the detector element output signals are input into a signal equalizer 60. The signal equalizer 60 adds an associated gain and level value, stored in a memory 62, for each one of the 240 detector pixel elements to correct any gain and level differences from each of the detector pixel signals so that the multiplexed digital signal output at 63 is uniform, thereby enhancing picture quality.

Still referring to the AVPC card 36, the digitized input signal (to the signal equalizer 60) is 12 bits. However, the signal equalizer, in correcting signal gain and level differences, subsequently increases the digital signal output to 19 significant bits. As the signal contains only 15 bits of usable data, saturation detector 64 sets all data above the 15 bit range to a saturation level of 1 and all data below the 15 bit range to 0. Therefore, only the useful data within the 15 bit range is output to the SHPC card 38. The AVPC card also includes a timing/control processing unit 68 implementing the clocks 53 and line timing for clocking multiplexed signals from the S/HMUX during a sample period. Preferably, the line timing HCLK has a clock sample rate of 240 TDI channels per sample period plus 16 clocks dead time. However, this rate may be varied by the present invention as necessary as will be described below. The AVPC card also includes an interface 70 that connects AVPC card components to a system microprocessor bus 72.

Turning now to the SHPC card 38, the signal output from the saturation detector 64 is input into a look-up table 74. Generally, the output dynamic range of the digitizing and signal equalizing process is greater than the maximum dynamic range of traditional image displays. Moreover, there are areas of the output dynamic range that have minimal or no information. Therefore, the output signal of the digitizing and signal equalizing process is input into a look-up table 74 to compress the information into display dynamic range. The look-up table provides a programmable method of mapping the larger input dynamic range into the smaller output dynamic range. The mapping can be varied continuously either based on manual input from a system operator or based on an automatic histogram-based method. Prior to the look-up table, the video is input to a histogram/accumulator 80. The histogram/accumulator 80 performs certain programmable functions, such as line summing, line grabbing, and histogramming of the digitized information. The look-up table 74 converts the 15 bit signal output from the saturation detector to an 8 bit output signal. The look-up table is preferably a 32 k×8 Random Access Memory (RAM) well known in the art such as Integrated Device Technology Model No. IDT71256, and can be varied continuously either based on manual input from a system operator or based on an automatic gain algorithm. The 15 bit signal output from the saturation detector is also converted to a 10 byte signal through a video shifter 76.

Also located on the SHPC card 38 are microprocessors 82 and 84. As discussed above, many functions are under microprocessor control. The microprocessor 84 performs numerous control-related operations associated with the control panel(s), controls the TDI clock rate for EFL compensation and histogram/accumulator function, and calculates the level equalization value for each pixel, the global level control value, and the look-up table values. The microprocessor 82 performs more system-based processing related functions and is operatively associated with a RAM 86 and an EEPROM 90. Both the RAM 86 and the EEPROM 90 store the software based commands controlling the electronic effective focal length compensator according to the preferred embodiment of the present invention, the function of which will be described in greater detail below.

Referring now to the MOSC card 40, the 8 bit output signal from the look-up table 74 is input through pixel buffers 92, 94 and output to both the gunner display 19 and the commander display 21 after being scan-converted via a frame memory and converted back to an analog signal through the digital to analog converter 96. Symbology may also be switched in for any pixel in the image signal by symbology processor 98 before being output through the digital analog converter 96. Such symbology data may include status indications, sighting cross hairs and instructional text at the bottom of either the commander or the gunner display.

Prior to being output to the display, the digitized signal is scan converted. Generally, the scanner scans the scene horizontally; thus, the data is multiplexed along vertical columns. Standard video displays, however, require the data to be output along horizontal lines. Therefore, the digitized data must be converted from the vertical column input format to a horizontal line output format. Moreover, because of the separation between the detector subarrays, the digitized data from the subarrays are delayed in time from each other. This delay must be removed. As discussed above, the delay is dependent of the imager's effective focal length and, because the data is digitized, correct removal of the delays depends upon correct compensation for the image focal length changes. The EFL compensator of the present invention provides both of these functions as will be described below.

Referring to FIGS. 3-6, implementation and operation of the electronic effective focal length compensator of the present invention will now be described in detail. As will be appreciated from the following description, the EFL compensator does not physically adjust the focal length of the imager assembly 25 through physical movement of imaging optics or through optics composed of materials that have physical properties that compensate for physical property changes in the imager optics during ambient temperature changes. Rather, the EFL compensator of the present invention compensates for imager EFL variations caused by manufacturing tolerances and/or ambient temperature changes through control of the aforementioned TDI clock rate. Thus, the EFL compensator of the present invention may be implemented in the thermal imaging system 10 with minimal additional cost and system complexity, unlike the aforementioned conventional EFL compensating mechanisms and techniques.

A large part of the EFL compensator system of the present invention is implemented through the imager assembly 25, the detector array 26, the detector assembly 27, the S/HMUX 52 and the processor 84. Providing the correct TDI clock rate as a function of the imager temperature is programmed into the processor 84 in a manner well known to those skilled in the art so that the components together effectively compensate for imager focal length variation.

In the preferred embodiment, the TDI rate and thus time delay is adjusted by changing the number of detector clocks per sample of the TDI clock 27b. The adjustment range is 644 detector clocks. The detector clock sample rate is fixed and is chosen to such that all variations in imager effective focal length can be compensated for within this adjustment range. For perfect compensation, the equation for the number of detector clocks per TDI clock rate is:

$$TDI\# \text{ theory} = EFL \text{ slope} * \text{Optics Temperature} + \text{Calibration} \quad (1)$$

In the equation above, EFL slope (units: DCLK/°C.) represents the slope of EFL compensation plotted versus temperature. Optic Temperature (°C.) is the temperature of the imager optics, and Calibration (units: DCLK) is the calibration value to be discussed below. Because the actual number of detector clocks per TDI can only be changed in integral numbers:

$$TDI\# = INT (TDI\# \text{ theory}) \quad (2)$$

where INT(x) is a function that rounds x to the nearest integer, e.g. INT(1.8)=2. To prevent TDI# from switching continuously at transitions, a dead band is provided such that if ABS(TDI# theory−TDI#)<0.5−EFL dead band, then TDI# is not changed, where ±EFL dead band (units: DCLK) is the desired dead band about each transition of TDI#. There should never be less than 60 DCLK sent to the detector assembly 26 by the DCLK clock 27d; therefore, if TDI# is less than 240, then the TDI# is set to 240.

The above EFL compensation will cause a boresight shift; therefore, boresight compensation is also implemented in the system of the present invention. The purpose of this compensation is to keep the image at the azimuth reticle position unchanged on the display. The azimuth reticle position corresponds to a unique scan angle and, thus, a unique time (i.e. number of high speed clocks) after the scantier field position signal, TI. The boresight compensation, therefore, maintains a constant number of detector clocks between TI and the sample corresponding to the reticle position. This is achieved by varying the number of detector clocks between TI and the start of the input field active. The new number of detector clocks between TI and the start of field active is related to the original number via:

$$TI\_FA_{new} = TI\_FA_{old} + Az \; BS*(TDI\#_{old} - TDI\#_{new}) \quad (3)$$

where Az BS is the azimuth pixel count of the boresight reticle with respect to the input field active.

A semi-automatic calibration of the aforementioned "Calibration" value utilizes the fact that detector subarrays 26a, 26b are separated by an exact integer number of azimuth pixels spatially; therefore, the number of detector clocks per TDI is correct when an image on the subarrays are separated by this exact integer number of azimuth pixels temporally. In the preferred embodiment, the subarrays are separated by 8 pixels and all of the even channels are on one subarray while all of the odds are on the other.

The system calibration involves the following steps. First, a vertical edge of an extended target scene is located at the azimuth boresight position, and the unit is commanded to perform the calibration of TDI#. The TDI# is set to the middle value, 64. Next, for the center even detector channel, a number of pixels centered about the azimuth boresight position are collected. This step is repeated for the center odd channel. Next, optics temperature is recorded from temperature sensor 25b.

Next, the 50% rise position (i.e. pixel number) of each channel to a fraction of a pixel, (center even) and (center odd), is determined. The correct number of high speed clocks per TDI makes the separation between (center even) and (center odd) exactly 8 TDIs:

$$TDI\# \text{ correction} = \frac{ABS(\text{center even} - \text{center odd}) \cdot TDI\#}{8} \quad (4)$$

The factory calibration value is:

$$FACTORY \; CAL = TDI\# \text{ correct} - EFL \text{ slope} \cdot TEMP \text{ optics} \quad (5)$$

where Temp optics is the optics temperature as measured by the imager lens temperature sensor 25b stored when the pixel data was collected. TDI# cal is stored in the EEPROM 90.

The value for EFL slope is derived from system and imager design information. The theoretical number of high speed clocks per TDI is:

$$TDI\# \text{ theory} = \frac{MCLKfreq}{\text{sample freq}} \quad (6)$$

$$= \frac{MCLKfreq \cdot \text{sample-size}}{\text{scan}} \text{ velocity} \cdot \text{imager } EFL$$

The table below shows the imager EFL vs. temperature and the corresponding number of high speed clocks per TDI according to one preferred embodiment of the present invention.

| Temperature (°C.) | EFL (in) | TDI# theory |
|---|---|---|
| +60 | 0.661 | 65.4 |
| +20 | 0.675 | 64.0 |
| −30 | 0.691 | 62.5 |

From this information, EFL slope=0.032 DCLK/°C.

Figure 7:
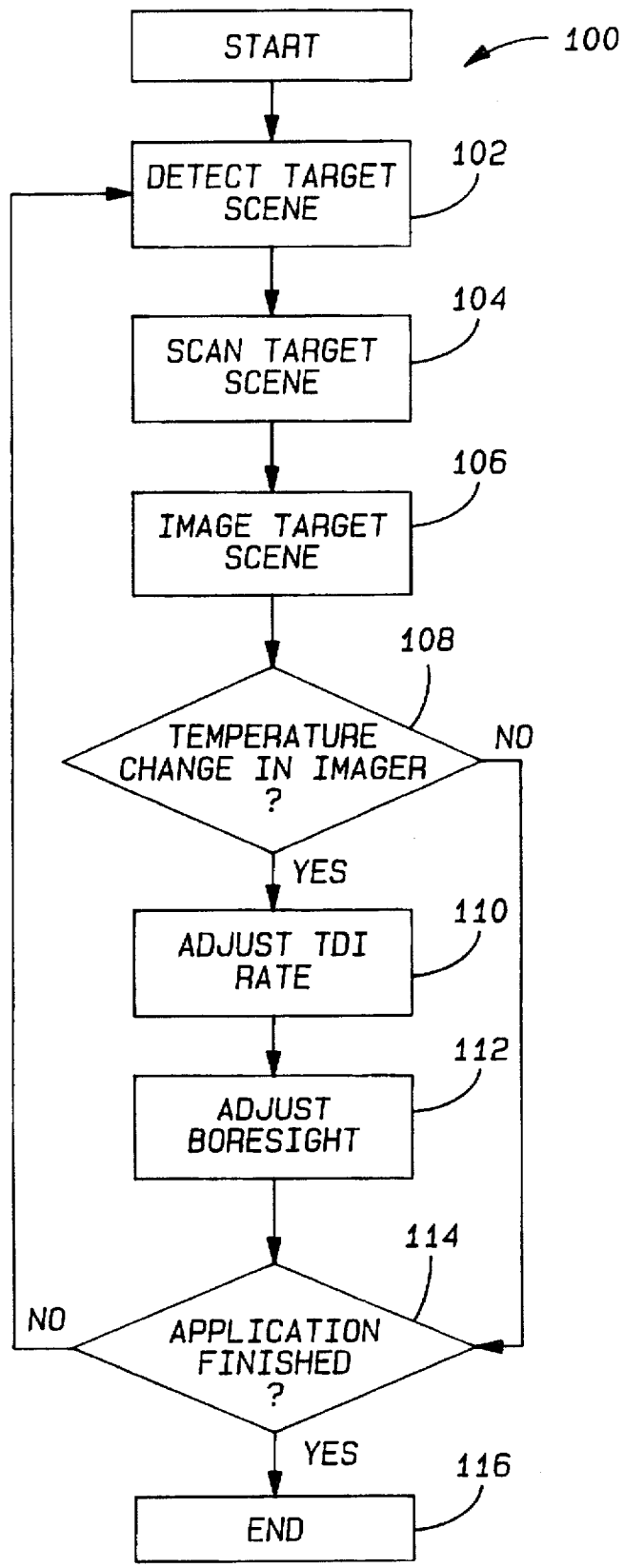
FIG. 7 is a flow diagram illustrating the preferred method of implementation of the electronic focal length compensator according to a preferred embodiment of the present invention.

Referring now to FIG. 7, a flow diagram shown generally at 100 illustrates the preferred method of implementing the electronic focal length compensator of the present invention in the thermal imaging system shown generally at 10 in FIG. 1. At step 102, the telescope assembly/head mirror configuration detects a target scene. At step 104, the scanner 23 scans the target scene at a constant rate. At step 106, the imager assembly 25 images the target scene scanned by the scanner 23 onto the detector elements of the detector assembly 26. The detector elements each output a clocked signal at an adjustable TDI sample rate, controlled by the clocks 27b and 27d, corresponding to the energy detected thereon, to the system electronics. Correspondingly, at step 108, the temperature sensor 25b determines if there has been a change in temperature of the imager assembly 23. If no change in temperature is detected and the application is not finished, the method returns to step 102 and the thermal imaging unit continues processing the detected scene, with the TDI rate remaining unchanged. If the imager temperature has changed by more than a set amount, the TDI rate of the clock 27b is adjusted at step 110 through adjustment of the DCLK clock 27d which in turn controls the TDI clock 27b. In addition, the display boresight is also adjusted at step 112 to compensate for the TDI rate adjustment at step 110. At step 114, the method determines if the application is finished. If so, the application is ended as indicated at step 116. If the application is not finished, the method returns to step 102 for further target scene processing.

Upon reading the foregoing detailed description, it should be appreciated by the reader that implementation of the focal length compensator of the present invention eliminates the need, and associated expense, of additional imaging system components to compensate for system imager focal length changes due to ambient temperature fluctuations and manufacturing tolerances. The electronic focal length compensator of the present invention exhibits a high degree of reliability and accuracy and, because of its software driven components, provides thermal imaging system flexibility and growth capability. In addition, the electronic focal length compensator of the present invention increases detected scene image quality and thereby enhances imaging overall thermal system performance.

Various other advantages of the present invention will become apparent to those skilled in the art after having the benefit of studying the foregoing text and drawings, taken in conjunction with the following claims.

What is claimed is:

1. An imaging system, comprising:

optics for detecting a scene;

a detector assembly being responsive to energy from said detected scene;

an imager for imaging said energy from said detected scene onto said detector assembly, said imager including an imager lens;

first clock means associated with said detector assembly for sampling detector assembly signals output at a first clock means sampling rate in response to said energy from said detected scene to induce a time delay in said detector assembly signals; and a processor for controlling said first clock means to maximize detected scene image quality through said first clock means sampling rate to electronically compensated for focal length variation of said imager lens; and an imager lens temperature sensor for sensing temperature changes at said imager lens and outputting a temperature signal to said processor that enables said processor to adjust said first clock means sample rate in response to temperature changes at said imager lens.

2. The imaging system of claim 1, further comprising a scanner for scanning said energy from said detected scene onto said detector assembly through said imager.

3. The imaging system of claim 2, wherein said first clock means varies said first clock means sampling rate to compensate for variations in scanner velocity.

4. The imaging system of claim 1, further comprising calibration means for electronically adjusting said focal length of said imager lens to compensate for manufacturing tolerances of said lens.

5. A military vehicle, comprising:

a thermal imaging unit including optics for detecting a scene, and a display;

a system for producing a high quality scene image on said display, comprising:

a detector assembly having a plurality of detector elements, each of said elements being electrically responsive to energy from said detected scene;

an imager including at least one imager lens for imaging said energy from said detected scene onto said detector elements to form said scene image, said imager including temperature sensing means;

said detector assembly including a first clock and a first multiplexer for providing a plurality of multiplexed outputs, said detector elements outputting signals in response to said energy from said detected scene through one of said multiplexed outputs at a first clock sample rate, said temperature sensing means operative to output an imager temperature signal used to adjust said first clock sample rate in response to sensed imager temperature changes; and a processor for controlling said first clock sample rate to maximize detected scene image quality, said processor varying said first clock sample rate to compensate for focal length variations in said imager lens in response to the imager temperature signal output by said temperature sensing means.

6. The military vehicle of claim 5, further comprising thermal imaging system electronics for processing said scene image; and a second multiplexer for further multiplexing said detector element signals and inputting said further multiplexed detector element signals into said thermal imaging system electronics.

7. The military vehicle of claim 6, further comprising a second clock associated with said thermal imaging system electronics having a second clock sample rate, said second clock controlling said first clock sample rate, said first clock sample rate being an integer multiple of said second clock sample rate.

8. The military vehicle of claim 7, wherein said second clock sample rate is adjustable between 240 and 272 samples in a sampling period.

9. The military vehicle of claim 5, further comprising a scanner for scanning said detected scene energy onto said detector array elements.

10. The military vehicle of claim 9, wherein said scanner has an associated scan rate that is matched to said first clock rate.

11. The military vehicle of claim 5, wherein said plurality of detector elements comprises 960 detector elements.

12. The military vehicle of claim 11, wherein said 960 detector elements comprise two 120×4 detector element subarrays, with each subarray having two multiplexed outputs.

13. In a thermal imaging system for detecting a target, said thermal imaging system including optics for detecting said target, and a display, a method of producing a coherent target image on said display, comprising:

providing an array of detector elements, each of said detector elements being electrically responsive to energy from said target;

imaging said energy from said target onto said array through an imager lens assembly;

scanning said energy from said detected target through said imager lens assembly onto said array at a preset rate;

clocking output signals of each of said detector elements at a first clock sample rate;

sensing the temperature of said imager lens assembly; and controlling said first clock sample rate to thereby compensate for focal length variations of said imager lens assembly due to temperature changes in said imager lens assembly detected during said step of sensing the temperature of said imager lens assembly.

14. The method of claim 13, further comprising the steps of:

multiplexing said detector element output signals sampled during said first clock sample rate;

clocking said output signals at a second clock sample rate; and further multiplexing said multiplexed output signals during said second clock sample rate.

15. The method of claim 14, further comprising the step of controlling said second clock sample rate simultaneously with said step of controlling the first clock sample rate to compensate for imager lens assembly focal length variations.

16. An imaging system, comprising:

optics for detecting a scene;

detector assembly being responsive to energy from said detected scene;

an imager for imaging said energy from said detected scene onto said detector assembly, said imager including an imager lens;

first clock means associated with said detector assembly for sampling detector assembly signals output at a first clock means sampling rate in response to said energy from said detected scene to induce a time delay in said detector assembly signals; and a processor for controlling said first clock means to maximize detected scene image quality through said first clock means sampling rate to electronically compensate for focal length variation of said imager lens due to manufacturing tolerances.

17. A military vehicle, comprising:

a thermal imaging unit including optics for detecting a scene, and a display;

a system for producing a high quality scene image on said display, comprising:

a detector assembly having a plurality of detector elements, each of said elements being electrically responsive to energy from said detected scene;

an imager including at least one imager lens for imaging said energy from said detected scene onto said detector elements to form said scene image;

said detector assembly including a first clock and a first multiplexer for providing a plurality of multiplexed outputs, said detector elements outputting signals in response to said energy from said detected scene through one of said multiplexed outputs at a first clock sample rate; and a processor for controlling said first clock sample rate to maximize detected scene image quality, said processor varying said first clock sample rate to compensate for focal length variations in said imager lens due to sensed manufacturing tolerances.

18. In a thermal imaging system for detecting a target, said thermal imaging system including optics for detecting said target, and a display, a method of producing a coherent target image on said display, comprising:

providing an array of detector elements, each of said detector elements being electrically responsive to energy from said target;

imaging said energy from said target onto said array through an imager lens assembly;

scanning said energy from said detected target through said imager lens assembly onto said array at a preset rate;

clocking output signals of each of said detector elements at a first clock sample rate; and controlling said first clock sample rate to thereby compensate for focal length variations of said imager lens assembly in response to manufacturing tolerances in said imager lens assembly.

* * * * *